(12) United States Patent
Lem et al.

(10) Patent No.: US 10,071,664 B2
(45) Date of Patent: Sep. 11, 2018

(54) SYSTEM AND METHOD FOR VARIABLE SOUND DAMPENING IN AN ADJUSTABLE VEHICLE SEAT

(71) Applicant: Ford Global Technologies, LLC, Dearborn, MI (US)

(72) Inventors: Jeroen Lem, Maastricht (NL); Brian Boland, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/299,673

(22) Filed: Oct. 21, 2016

(65) Prior Publication Data

US 2018/0111520 A1    Apr. 26, 2018

(51) Int. Cl.
*B60N 2/90* (2018.01)
*B60N 2/44* (2006.01)
*G10K 11/16* (2006.01)
*G10K 11/172* (2006.01)

(52) U.S. Cl.
CPC .......... *B60N 2/914* (2018.02); *B60N 2/4415* (2013.01); *G10K 11/161* (2013.01); *G10K 11/172* (2013.01)

(58) Field of Classification Search
CPC .... B60N 2/914; B60N 2/4415; G10K 11/161; G10K 11/172
See application file for complete search history.

(56) References Cited

U.S. PATENT DOCUMENTS

| | | |
|---|---|---|
| 4,449,609 A | 5/1984 | Stoll |
| 5,767,459 A | 6/1998 | Sell |
| 6,202,785 B1 | 3/2001 | Hilling et al. |
| 6,520,285 B2 | 2/2003 | Tobias |
| 8,888,193 B2 * | 11/2014 | Wielgosz ............... B60N 2/448 297/452.41 |
| 2012/0143108 A1 | 6/2012 | Bocsanyi et al. |
| 2016/0066699 A1 * | 3/2016 | Rydsund ............. G10K 11/161 5/53.1 |

* cited by examiner

*Primary Examiner* — Philip F Gabler
(74) *Attorney, Agent, or Firm* — Vichit Chea; Price Heneveld LLP

(57) ABSTRACT

A vehicle seat includes a first inflatable bladder and a pump fluidically coupled with the first bladder. A sound dampening assembly is fluidically coupled between the first bladder and the pump and includes an inner chamber defined by a first and second telescoping portions and a motor coupled between the first and second telescoping portions. A controller causes the motor to adjust the inner chamber in response to an operation of the pump.

15 Claims, 3 Drawing Sheets

SYSTEM AND METHOD FOR VARIABLE SOUND DAMPENING IN AN ADJUSTABLE VEHICLE SEAT

FIELD OF THE INVENTION

The present invention generally relates to a sound dampening assembly for a pneumatically-adjustable vehicle seat. In particular, the sound dampening assembly is adjustable to compensate for a pump operating at variable speeds.

BACKGROUND OF THE INVENTION

Advances in automotive acoustics have led to a quieter vehicle interior. Not only are these advances aimed at reducing the noise from the engine, but also toward reducing noises reaching the cabin from externally, such as road noise and the like. This means that sound emissions from systems in the interior cabin that run while the vehicle is being driven have become more apparent. Accordingly, there is the need to reduce the sound emission of these systems as well.

In vehicles with pneumatically adjustable seats, in which one or more bladders is inflated and deflated to adjust an adjacent portion of the seating surface, the seat adjustment system is one such system that is intermittently active during vehicle use. In particular, the pressures in the air bladders are controlled through a module with a number of valves. Each of these valves can inflate and deflate the bladders that are connected to this valve. The air pressure is supplied by one or more pumps. The main cause of noise of this system is the pump, but also the air rushing in the tubes and rushing into the bladder can make a significant amount of additional noise. The frequency of the sound emitted by the pump depends on the speed (measured in revolutions-per-minute ("RPM")) of the pump. In some implementations the control systems of such seats may not have one set pump speed, but may use multiple speeds, depending on the airflow need at a given instance. Known solutions for filtering or otherwise reducing pump noise within such a pneumatic system can cancel out or reduce a primary frequency for which they are tuned but cannot compensate for the use of a pump at varying speeds or the like.

SUMMARY OF THE INVENTION

According to one aspect of the present disclosure, a vehicle seat includes a first inflatable bladder and a pump fluidically coupled with the first bladder. A sound dampening assembly is fluidically coupled between the first bladder and the pump and includes an inner chamber defined by a first and second telescoping portions and a motor coupled between the first and second telescoping portions. A controller causes the motor to adjust the inner chamber in response to an operation of the pump.

According to another aspect of the present disclosure, a seat customization system includes a first inflatable bladder and a pump fluidically coupled with the first bladder. The system further includes a sound dampening assembly fluidically coupled between the first bladder and the pump and including an inner chamber defined by a first and second telescoping portions and a motor coupled between the first and second telescoping portions. A controller causes the motor to adjust the inner chamber in response to an operation of the pump.

According to another aspect of the present disclosure, a method for adjusting a vehicle seat includes activating a pump at a selected speed from a number of selectable speeds to inflate a first bladder and adjusting an inner chamber within a sound dampening assembly that is fluidically coupled between the first bladder and the pump. The inner chamber is adjusted to cancel at least one primary frequency generated by the pump that varies with the speed thereof.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
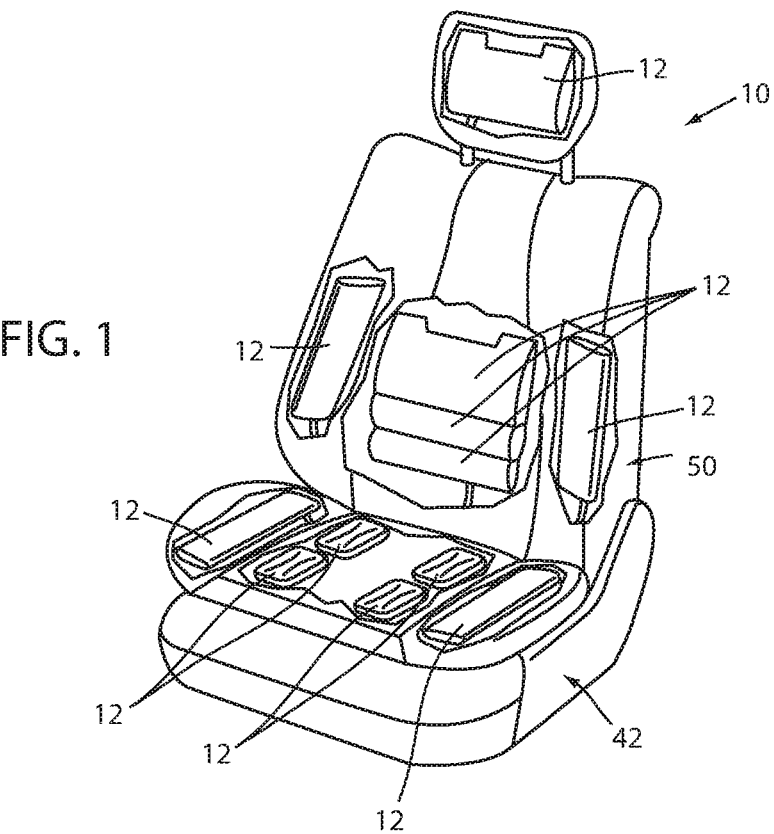
FIG. 1 is a front perspective view of a vehicle seat with cutaway portions thereof showing aspects of a seat adjustment system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
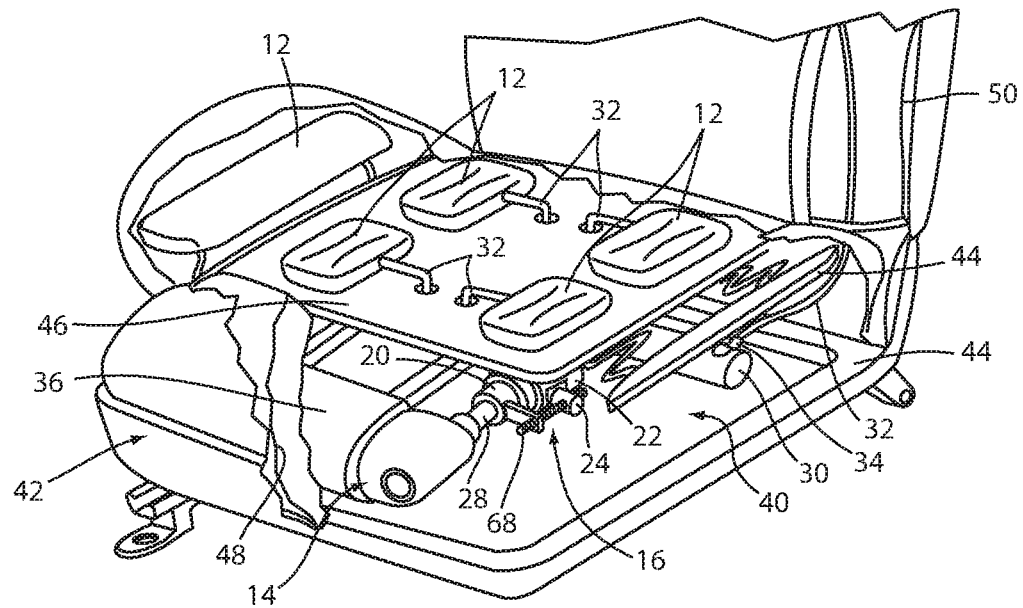
FIG. 2 is a perspective cutaway view of a portion of the vehicle seat of FIG. 1 showing further aspects of the adjustment system as well as a sound dampening assembly associated therewith.

Referring now to FIGS. 1-4, reference numeral 10 generally designates a vehicle seat. Vehicle seat 10 includes an inflatable bladder 12, a pump 14 fluidically coupled with the bladder 12, and a sound dampening assembly 16 fluidically coupled between the bladder 12 and pump 14. In particular, as shown in FIG. 2, sound dampening assembly 16 can be coupled between pump 14 and a manifold 30 that includes at least one valve associated with the bladder 12. In an alternative arrangement, sound dampening assembly 16 can be included between manifold 30 (or another assembly of the aforementioned at least one valve) and bladder 12. Sound dampening assembly 16 further includes an inner chamber 18 defined by a first telescoping portion 20 and a second telescoping portion 22. A motor 24 is coupled between the first telescoping portion 20 and the second telescoping portion 22. Vehicle seat 10 further includes a controller 26 causing the motor 24 to adjust the inner chamber 18 in response to an operation of pump 14.

In one aspect, the above-described operation of pump 14 can be an operating speed of the pump 14. Such a speed can be controlled by controller 26 and can be done to provide a desired flow of air to the above-mentioned bladder 12, or an arrangement of multiple bladders 12 included within vehicle seat 10 and fluidically coupled with pump 14. In particular, in one implementation of vehicle seat 10, as illustrated in FIGS. 1 and 2, seat 10 can include multiple bladders 12 throughout various locations of vehicle seat 10. Such bladders 12 can be fluidically coupled with pump 14 via a supply line 28 coupled with pump 14 and further coupled with a manifold 30 upstream thereof. Manifold 30 can, in turn, connect with respective branches 32 that extend from various outlets 34 to respective ones of bladders 12. Manifold 30 can include a series of valves therein that can control the flow of air received from pump 14 through various ones of branches 32 in accordance with a desired adjustment or inflation mode with respect to bladders 12. In one example, various ones of bladders 12 can be inflated either individually or collectively, depending on an inflation mode implemented by the occupant of seat 10. In this manner, the amount of air required by pump 14 may vary in accordance with the respective sizes of the bladders 12 being filled, as well as the number of bladders 12 being filled at any given time. Still further various controllers 26 associated with vehicle seat 10 may provide for different inflation speeds that may correspond with a faster massage action or may otherwise be needed when implementing massage over a large area or multiple areas. Still further, such variable speeds may allow for a user to rapidly fill a desired bladder 12 or bladders 12 for desired adjustments to seat 10, while providing additional fine-tuning modes.

In any of the scenarios just described, it may be found to be advantageous to vary the speed of pump 14 by way of the particular signal and/or power provided by controller 26 thereto. In one example, pump 14 can be a four-chamber diaphragm pump, in which a pump motor 36 included within pump 14 drives the rotation of an implement that acts on, for example, four diaphragms in series to compress the respective diaphragms, thereby initiating a flow of air from out of pump 14. The direction of the flow of air out of pump 14 is maintained by a series of valves within pump 14. In this manner, increasing the speed of air flow from out of pump 14 can include increasing the speed of pump motor 36, which, in turn, increases the frequency by which the included diaphragms are compressed. This results in a change in an output frequency of noise generated by pump motor 36, as well as the frequency by which the included valves operate.

In this manner, controller 26 can cause motor 24 to adjust inner chamber 18 by driving motor 24 to change a length 38 of inner chamber 18 to cancel at least one primary frequency of the operation of the pump 14 that varies with the speed of the pump 14. As described above such operational characteristics can include both the primary operational frequency of pump motor 36, as well as or in addition, to the frequency of operation of any valves included within pump 14. In this manner, and as described further below, sound dampening assembly 16 may include a structure, examples of which are discussed further below, that act to reduce noise by utilizing resonance principles to develop sound waves within inner chamber 18 that act to cancel out sound waves at a particular frequency by shifting the phase of an identical frequency to oppose the frequency to be canceled. Because, as presently described, pump 14 is operated by controller 26 at variable speeds, inner chamber 18 is also made adjustable, such as by adjusting the length 38 thereof to, correspondingly, vary the ability of sound dampening assembly 16 to appropriately shift the phase of the desired frequency of pump 14.

As shown in FIG. 2, both pump 14, manifold 30, and sound dampening assembly 16 can be positioned within vehicle seat 10. In the illustrated embodiment, pump 14 and manifold can be positioned within a cushion cavity 40 defined in an interior of the cushion 42 of vehicle seat 10. In further embodiments, at least one of the pump 14 and manifold 30 can be included in a similar cavity within the seatback 50. Still further, at least the pump 14 can be located remote from seat 10 within the associated vehicle (such as within the trunk, for example). As shown, cushion 42 can include an internal frame 44 to which at least pump 14 and manifold 30 can be mounted (mounting within the seatback 50 may be similarly achieved). In this manner, it may further be advantageous to mount portions of sound dampening assembly 16 to frame 44; however, the rigidity of supply line 28, for example, may sufficiently retain sound dampening assembly 16 within a desired location with respect to cushion cavity 40. As further shown, pump 14, sound dampening assembly 16, and manifold 30 may be positioned beneath a carrier 46 that may be mounted with additional portions of frame 44 to define the general shape of the seating surface of cushion 42 as well as to support one or more bladders 12 associated therewith. In this manner, a coverstock 48 may be supported at least by portions of frame 44 as well as by carrier 46 so as to conceal the interior features of seat 10, thus described, as well as to provide the desired appearance and feel of seat 10, including of cushion 42. Accordingly, the configuration of seat 10, including of cushion 42, may be altered by adjusting the inflation levels of bladders 12 positioned beneath coverstock 48 in order to vary the firmness and/or outward shape of coverstock 48.

As further shown in FIG. 1, a seatback 50 may be coupled with cushion 42, which may include in a generally adjustable manner, and may further include additional ones of bladders 12 that may also be connected with manifold 30 for a controlled supply of air to be directed thereto, as provided by pump 14 in a similar manner to that which is described above. Although depicted in connection with and generally described as features of a vehicle seat 10, the seat adjustment system 52, described herein, and including pump 14, manifold 30, bladders 12, and sound dampening assembly 16 can be used in connection with additional types of seats, including office chairs or the like, and further can be used in benches, beds, or additional supportive furniture, as desired. In such implementations, various ones of controller 26, pump 14, manifold 30, and sound dampening assembly 16 can be included within the particular seating element or can be external thereto. In general, sound dampening assembly 16 may be housed in a similar structure to pump 14 whether in the seating element itself or not, so that the sound emanating from pump 14 can best be neutralized.

Figure 3:
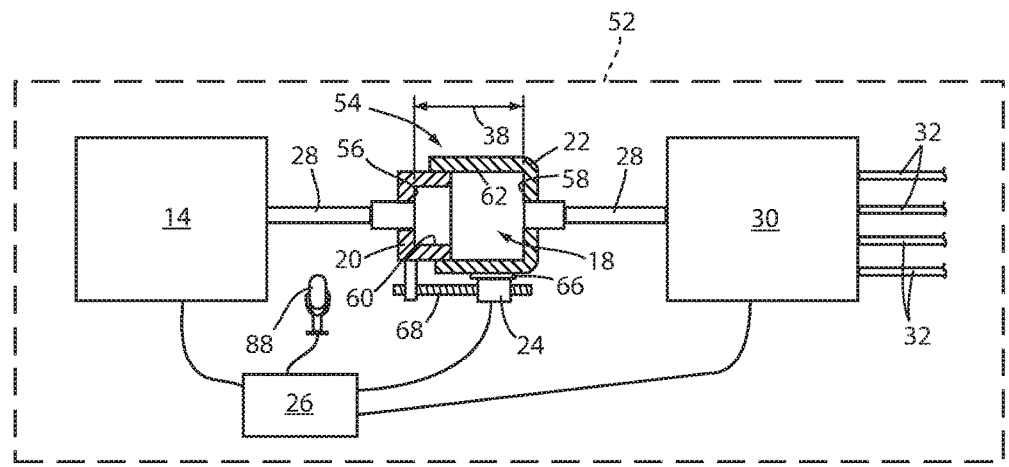
FIG. 3 is a schematic diagram of one implementation of the sound dampening assembly.
Figure 4:
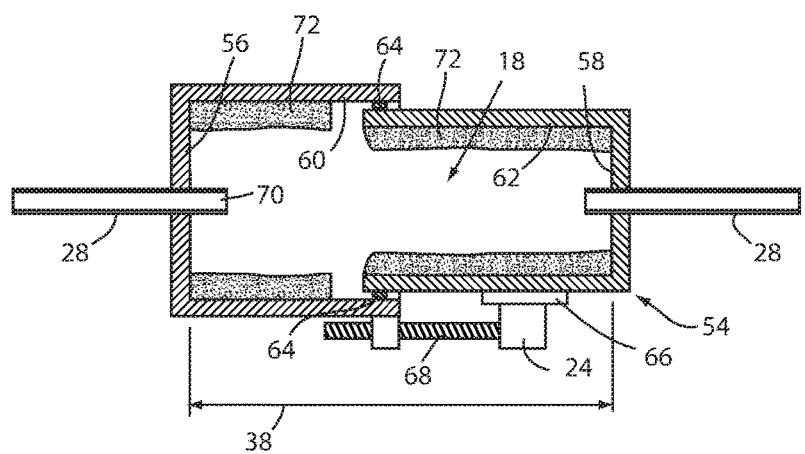
FIG. 4 is a cross-sectional view of a muffler used in the sound dampening assembly of FIG. 3.

With attention to FIG. 3, one embodiment of the above-described sound dampening assembly 16 (FIG. 2) incorporates a muffler 54 to define inner chamber 18. As shown, muffler 54 is generally cylindrical in shape and defines a first end 56 on first telescoping portion 20 and a second opposite facing end 58 on second telescoping portion 22. In a similar manner, respective first 60 and second 62 sidewall portions extend away from the respective first and second ends 56 and 58 such that first telescoping portion 20 is slidably received within second telescoping portion 22. As shown in FIG. 4, an O-ring 64 can be coupled with either first telescoping portion 20 or second telescoping portion 22 to help maintain a seal within inner chamber 18. As further shown in FIGS. 3 and 4, motor 24 is mounted with one of first telescoping portion 20 and second telescoping portion 22 via a motor mount 66 extending therefrom. In the embodiment shown, motor mount 66 extends from second telescoping portion 22, however an opposite arrangement is possible. As further shown, a motor arm 68 is coupled with the opposite of first telescoping portion 20 and second telescoping portion 22 (first telescoping portion 20 in the example shown) and is operably coupled with motor 24 such that operation of motor 24 in either a forward or reverse direction causes respective extension or retraction of motor arm 68 with respect thereto to drive extension of first telescoping portion 20 from second telescoping portion 22 or, oppositely, retraction of first telescoping portion 20 into second telescoping portion 22. Such movement, accordingly, causes respective increasing and decreasing of length 38 of inner chamber 18.

As is generally understood, the length 38 of inner chamber 18 serves to determine a distance between first end 56 and second end 58 of inner chamber 18. In this manner, sound entering inner chamber 18 through an inlet 70 and first end 56 and accordingly, carrying sound waves from pump 14, may reflect off of second end 58 such that the sound waves carried therein will double-up over those still entering through inlet 70. Accordingly, if length 38 of inner chamber 18 is equal to a half-phase of the wavelength of such soundwaves (i.e. the inverse of the frequency), or an appropriate multiple thereof, the sound waves reflecting off of second end 58 will at least partially cancel the sound waves entering inner chamber 18 through inlet 70. In this manner, the length 38 of inner chamber 18 can be adjusted in accordance with the frequency of operation of pump 14 (e.g. the speed of pump motor 36) to allow sound dampening assembly 16 to cancel at least a portion of the sound generated by pump 14 at varying operational speeds thereof.

In various examples, motor 24 can include an output gear or an output screw to appropriately interact with variations of motor arm 68 that may be in the form of either a gear rack or a power screw, respectively. Further, muffler 54 including first telescoping portion 20 and second telescoping portion 22 can be of a rigid, polymeric material such as plastic or the like, although other materials, including various metals, are possible. As shown in FIG. 4, muffler 54 can include additional dampening material 72, such as foam or the like, which may be adhered to the respective sidewall portions 60 and 62 of first telescoping portion 20 and second telescoping portion 22, as illustrated, and may also be adhered to the respective ends 56 and 58, with appropriate holes therein for supply line 28. Such dampening material 72 may serve to dissipate or dampen additional sound frequencies not canceled out by the adjusted length 38 of inner chamber 18, and may, further, be positioned to not interfere with the above-described adjusting of length 38 of inner chamber 18. Further, various routing elements can be included within inner chamber 38 to control the flow of sound waves and air within inner chamber in a manner similar to those used in vehicle mufflers.

Figure 5:
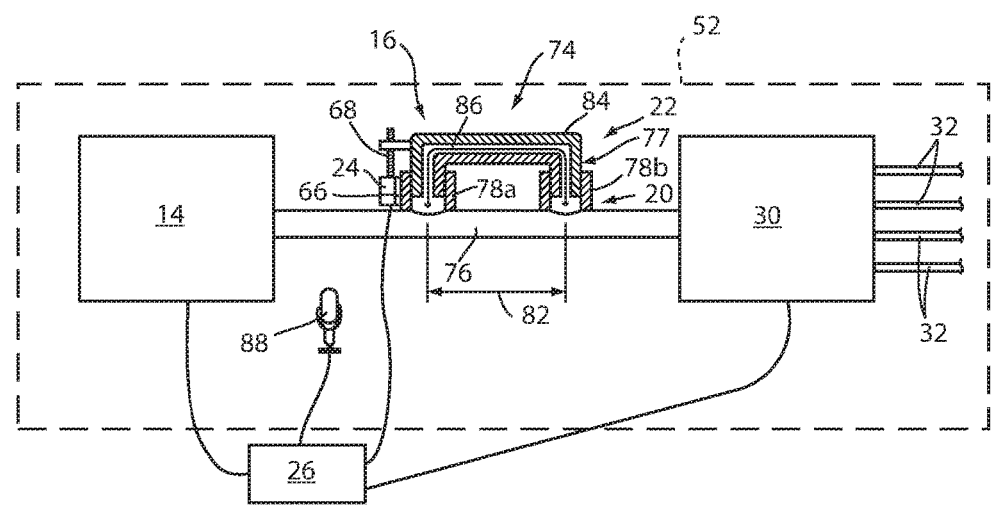
FIG. 5 is a schematic diagram of an alternative implementation of the sound dampening assembly.

Turning now to FIG. 5, an alternative embodiment of sound dampening assembly 16 may include a dual pneumatic-tube arrangement 74 having a first tube 76 of a fixed length 82, along with a second tube 77 of an adjustable length 86 that branches off from first tube 76 before rejoining therewith downstream. In general, such arrangements may function using similar principles to the muffler 54 described above. In particular, the length 86 of second tube 77 may be greater than a comparative length 82 of first tube 76 by a half-phase of the wavelength of the sound desired to be dampened thereby, or an odd multiple of such wavelength. In this manner, sound dampening assembly 16 can be structured such that first telescoping portion 20 is defined by respective receptacles 78a and 78b branching off from first tube 76 so as to be spaced apart by first length 82. In this manner, receptacles 78a and 78b can collectively define first telescoping portion 20 of sound dampening assembly 16. Similarly, second telescoping portion 22 can be defined by a tube body 84 with respective ends received within receptacles 78a, and 78b in a slidable manner such that a length 86 of second tube 77, defined as a distance through receptacle 78a, tube body 84 and receptacle 78b can vary by slidable movement of tube body 84 with respect to receptacles 78a and 78b. In this manner length 86 can be adjusted with respect to first length 82 such that air moving through tube body 84 and into receptacle 78b to join with air through first tube 76 is appropriately out of phase to achieve cancelation of the sound present upstream of receptacle 78a.

As further shown in FIG. 5, motor 24 can be mounted with first telescoping portion 20, such as by being mounted with receptacle 78a and can operably engage with a motor arm 68 mounted with second telescoping portion 22, such as by extending from tube body 84 such that operation of motor 24 can cause extension or retraction of second telescoping portion 22 with respect to first telescoping portion 20, in a similar manner to that which is described above with respect to FIGS. 3 and 4.

Figure 6:
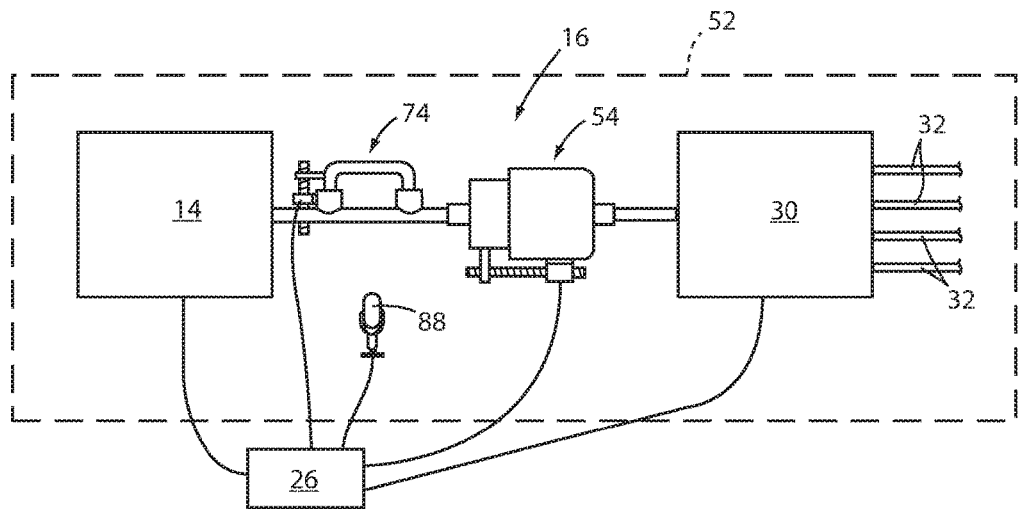
FIG. 6 is a schematic diagram of yet another implementation of the sound dampening assembly.

Turning now to FIG. 6, a further embodiment of system 52 is shown in which sound dampening assembly 16 includes both the muffler 54, as described above, and the dual tube arrangement 74, also discussed above. In such an embodiment, the muffler 54 and the dual tube arrangement 74 can be separately adjusted by controller 26, in a manner similar to that which is discussed above with respect to FIGS. 3 and 4, as well as FIG. 5, respectively. In such an arrangement, both the muffler 54 and the dual tube arrangement 74 can be used to reduce and/or cancel sound emanating from pump 14 of the same frequency, with the upstream one of muffler 54 and dual tube arrangement 74 (dual tube arrangement 74, as depicted in FIG. 6) can reduce the pressure of the sound at such frequency, with the other of muffler 54 and dual tube arrangement 74 serving to further reduce or eliminate the presence of sound at such frequency. Alternatively, muffler 54 and dual tube arrangement 74 can be used to reduce or eliminate sound at different frequencies, for example, with dual tube arrangement 74 being utilized to reduce the sound from the valves contained in pump 14, and muffler 54 being used to reduce the sound from pump motor 36 (FIG. 1). Other examples of such targeted use of the elements included within sound dampening assembly 16 are possible and can be tailored based on the particular respective abilities and effectiveness of muffler 54 and dual tube arrangement 74.

As shown in FIGS. 3-6, the various embodiments of system 52 can include a microphone 88 coupled with controller 26 that can be used to measure the sound pressure level within system 52 and, more particularly within cushion cavity 40 in the embodiment illustrated in FIG. 2, to implement a feedback loop or the like to dynamically adjust the respective inner chambers 18 within the various implementations of sound dampening assembly 16 within which it is incorporated. In an example, controller 26 can take the signal from microphone 88 and filter such a signal to determine a primary frequency of the sound being measured by microphone 88. Controller 26 can then drive motor 24 to adjust inner chamber 18, as described above, to reduce the pressure level of such frequency, as reflected in the continuing signal received from microphone 88. Such a feedback loop can be implemented by incorporating a proportional-integral controller into the general functionality of controller 26 itself. In an alternative, a similar control loop can be implemented to attempt to reduce an overall sound pressure level as measured by microphone 88, including within cushion cavity 40 for example, without isolating a particular frequency, in an attempt to reduce the overall sound pressure level as measured by microphone 88 to a minimum level. In a further alternative, microphone 88 can be used by controller 26 to isolate and/or otherwise determine a primary frequency within the signal received from microphone 88 and can calculate or obtain otherwise stored data related to an appropriate length 38 of inner chamber 18 for reducing or eliminating such frequency and can control motor 24 to directly drive the length 38 of inner chamber 18 to the calculated or referenced length 38. In a still further alternative, system 52 can be implemented without the use of a microphone 88 by incorporating into memory within controller 26 a pre-programmed relationship of lengths 38 of inner chamber 18 corresponding with the frequency of pump motor 36 at various predetermined operating speeds thereof. In this manner, when pump 14 is operated at such predetermined speeds, controller 26 can drive motor 24 to adjust the length 38 of inner chamber 18 to the predetermined length 38 to correlate with the operating speed by way of the pump speed signal output by controller 26. In such an implementation, controller 26 can limit or otherwise control the speed at which pump motor 36 is ramped up to the desired speed to correlate with the speed at which motor 24 can adjust the length 38 of inner chamber 18. Alternatively, controller 26 can implement a slight delay before activating pump motor 36 at the desired speed to allow for the desired adjustment of length 38 of inner chamber 18.

In this manner, a method implemented by the above-described system 52 according to the variations in FIGS. 3-6, for example, can be directed toward adjusting a vehicle seat similar to seat 10 depicted in FIGS. 1 and 2, and can include activating pump 14 at a selected speed from a number of predetermined selectable speeds to inflate at least one bladder 12 or a series of bladders 12 connected therewith in accordance with a command input by an occupant of seat 10 to make a particular adjustment thereof. It is noted that the various predetermined speeds can be at set intervals or can be continuously adjustable within a predetermined range of such speeds. In conjunction with the activation of pump 14, controller 26 can adjust the inner chamber 18 within sound dampening assembly 16 that is, as described above, fluidically coupled between bladder 12 and pump 14. In particular, the inner chamber 18 is adjusted to reduce at least one primary frequency generated by pump 14 that varies with the speed thereof. In a manner consistent with the embodiments described above, the method can further include adjusting the inner chamber 18 by moving second telescoping portion 22 with respect to first telescoping portion 20 or vice versa, which, as described above, can be done by controlling motor 24 that is coupled between the first and second telescoping portions 20,22.

As also described above, controller 26 can implement the above-described method by using a microphone 88 in connection with a feedback loop tuned to drive the length 38 of inner chamber 18 to a specific length 38 that most effectively reduces an overall sound level within system 52 or most effectively reduces a specific frequency. As an alternative, inner chamber 18 can be adjusted by controller 26, according with the variation of the method, based on a predetermined relationship between the selectable pump speeds of pump 14 and a corresponding desired length 38 of inner chamber 18.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
a first inflatable bladder;
a pump fluidically coupled with the first bladder;
a sound dampening assembly fluidically coupled between the first bladder and the pump and including an inner chamber defined by a first and second telescoping portions and a motor coupled between the first and second telescoping portions; and a controller causing the motor to adjust the inner chamber in response to an operation of the pump.

2. The vehicle seat of claim 1, wherein:
the sound dampening assembly is a muffler having first and second facing ends of the chamber defined respectively on the first and second telescoping portions; and
causing the motor to adjust the inner chamber includes adjusting a distance between the first and second facing ends.

3. The vehicle seat of claim 2, wherein the muffler further includes at least one sound dampening material lining at least a portion of the inner chamber.

4. The vehicle seat of claim 1, wherein:
the sound dampening assembly is a dual-pneumatic tube unit including a first tube of a fixed length and a second tube including the first and second telescoping portions; and
the first and second telescoping portions are fluidically coupled together at a first end and a second end of the second telescoping portion.

5. The vehicle seat of claim 4, wherein causing the motor to adjust the inner chamber includes adjusting a length of the second tube.

6. The vehicle seat of claim 1, wherein:
the operation of the pump is a speed of the pump; and
the controller causes the motor to adjust the inner chamber in response to the operation of the pump by driving the motor to change a length of the inner chamber to cancel at least one primary frequency of the operation of the pump that varies with the speed of the pump.

7. The vehicle seat of claim 6, wherein the controller causes the motor to adjust the inner chamber based on a pre-programmed relationship between a pump speed signal and a corresponding desired length of the inner chamber.

8. The vehicle seat of claim 1, further including a microphone positioned adjacent the pump and in communication with the controller, wherein:
the controller implements a feedback loop using the microphone to causes the motor to adjust the inner chamber in response to the operation of the pump to drive a sound level observed by the microphone toward a minimum level.

9. The vehicle seat of claim 1, wherein:
the vehicle seat includes a cushion and a seatback coupled with the cushion; and
the pump and sound dampening assembly are mounted within the cushion.

10. A seat customization system, comprising:
a first inflatable bladder;
a pump fluidically coupled with the first bladder;
a sound dampening assembly fluidically coupled between the first bladder and the pump and including an inner chamber defined by a first and second telescoping portions and a motor coupled between the first and second telescoping portions; and
a controller causing the motor to adjust the inner chamber in response to an operation of the pump.

11. The system of claim 10, wherein:
the sound dampening assembly is a muffler having first and second facing ends of the chamber defined respectively on the first and second telescoping portions; and
causing the motor to adjust the inner chamber includes adjusting a distance between the first and second facing ends.

12. The system of claim 10, wherein:
the sound dampening assembly is a dual-pneumatic tube unit including a first tube of a fixed length and a second tube including the first and second telescoping portions;
the first and second telescoping portions are fluidically coupled together at a first end and a second end of the second telescoping portion; and
causing the motor to adjust the inner chamber includes adjusting a length of the second tube.

13. The system of claim 10, wherein:
the operation of the pump is a speed of the pump; and
the controller causes the motor to adjust the inner chamber in response to the operation of the pump by driving the motor to change a length of the inner chamber to cancel at least one primary frequency of the operation of the pump that varies with the speed of the pump.

14. The system of claim 13, wherein the controller causes the motor to adjust the inner chamber based on a pre-programmed relationship between a pump speed signal and a corresponding desired length of the inner chamber.

15. The system of claim 10, further including a microphone positioned adjacent the pump and in communication with the controller, wherein:
the controller implements a feedback loop using the microphone to causes the motor to adjust the inner chamber in response to the operation of the pump to drive a sound level observed by the microphone toward a minimum level.

* * * * *